(12) United States Patent
Lee (10) Patent No.: US 12,468,844 B2
(45) Date of Patent: Nov. 11, 2025

(54) STORAGE DEVICE AND METHOD FOR GENERATING TOKEN

(71) Applicant: SAMSUNG ELECTRONICS CO., LTD., Suwon-si (KR)

(72) Inventor: Seung-Ho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 193 days.

(21) Appl. No.: 18/349,797

(22) Filed: Jul. 10, 2023

(65) Prior Publication Data

US 2024/0220651 A1  Jul. 4, 2024

(30) Foreign Application Priority Data

Jan. 3, 2023  (KR) ........................ 10-2023-0000761

(51) Int. Cl.
*G06F 21/62* (2013.01)
*G06F 21/33* (2013.01)

(52) U.S. Cl.
CPC .......... *G06F 21/6245* (2013.01); *G06F 21/33* (2013.01)

(58) Field of Classification Search
CPC ...... G06F 21/6245; G06F 21/33; G06F 21/79; G06F 21/602; G06F 21/62; G06F 21/64; H04L 9/3213; H04L 9/3263; H04L 63/101; H04L 9/3247; H04L 2209/08

USPC ......................................................... 726/26
See application file for complete search history.

(56) References Cited

U.S. PATENT DOCUMENTS

| | | | |
|---|---|---|---|
| 8,042,163 B1 | 10/2011 | Karr et al. | |
| 9,444,822 B1 | 9/2016 | Borowiec et al. | |
| 9,648,007 B1 | 5/2017 | Sterling et al. | |
| 9,805,210 B2 | 10/2017 | Nord et al. | |
| 11,095,706 B1 | 8/2021 | Ankam et al. | |
| 2021/0314308 A1* | 10/2021 | Kalantri | H04L 63/102 |
| 2023/0116751 A1* | 4/2023 | Chien | H04L 9/3268 |
| | | | 713/156 |
| 2023/0163967 A1* | 5/2023 | Cannata, Jr. | H04L 9/3263 |
| | | | 713/156 |

FOREIGN PATENT DOCUMENTS

| | | |
|---|---|---|
| CN | 111767527 | 10/2020 |
| JP | 6721903 | 7/2020 |

\* cited by examiner

*Primary Examiner* — Jacob Lipman
(74) *Attorney, Agent, or Firm* — MORGAN, LEWIS & BOCKIUS LLP (57) ABSTRACT

A storage device includes: a nonvolatile memory storing data of a first user; and a storage controller configured to receive an access request from a second user to access the data of the first user, obtain access approval for accessing the data from the first user in response to the access request, generate a token granting access authority to the second user for accessing the data using an Embedded Certificate Authority (ECA) upon obtaining the access approval, and send the token to the second user.

20 Claims, 11 Drawing Sheets

STORAGE DEVICE AND METHOD FOR GENERATING TOKEN

CROSS-REFERENCE TO RELATED APPLICATION

This U.S. patent application claims priority under 35 U.S.C § 119 to Korean Patent Application No. 10-2023-0000761 filed in the Korean Intellectual Property Office on Jan. 3, 2023, the disclosure of which is incorporated by reference herein.

(1) TECHNICAL FIELD

The disclosure relates to a storage device and a method for generating a token.

(2) DISCUSSION OF RELATED ART

A storage device such as a solid state drive (SSD) is used as a data storage medium. A recent storage device supports a Device Identifier Composition Engine (DICE) developed by the Trusted Computing Group (TCG), and thus may use an Embedded Certificate Authority (ECA). The ECA allows the storage device to operate as a Root of Trust (ROT). The RoT is a source that can always be trusted within a cryptographic system. However, since hacking is still a concern, there is a need for methods for increasing security of data accessed in a system that makes use of an ECA.

SUMMARY

At least one embodiment provides a storage device that performs an access control function.

At least one embodiment provides a storage device and a method for generating a token capable of sharing data between users through the token.

A storage device according to an embodiment includes: a nonvolatile memory in which data of a first user are stored; and a storage controller that receives an access request from a second user to access the data of the first user, obtains access approval for accessing the data from the first user in response to the access request, generates a token granting access authority to the second user for accessing the data using an Embedded Certificate Authority (ECA) upon obtaining the access approval, and sends the token to the second user.

The storage controller may receive user information including a public key of the second user from the second user, and may generate a user certificate including the user information and information of the ECA using a device private key of the storage device.

The storage controller may transmit a nonce and a device certificate to the second user, may generate a value obtained by encrypting the nonce and the user certificate from the second user, may verify the user certificate with a device public key paired with the device private key, may decrypt the value with the public key of the second user included in the user certificate to generate a decrypted value, and compare the decrypted value with the nonce.

The access request may include a data request format including identification information of the second user, information on the data, and a signature of the second user.

The access approval of the first user may include a semi-token including the data request format, identification information of the first user, a condition of the access approval, and a signature of the first user.

The storage controller may generate the token including a signature of the ECA generated by signing the semi-token and information of the ECA with a device private key of the storage device, the semi-token, and the information of the ECA.

The storage controller may receive the token from the second user, may verify the signature of the ECA, and may send the data to the second user when the signature is verified.

The storage controller may verify the signature of the ECA with a device public key paired with the device private key.

The storage controller may receive the token from the second user, may check whether the data is valid, and may send the data to the second user when the check indicates the data is valid.

The storage controller may receive the token from the second user, may check whether the condition of the access approval is satisfied, and may send the data to the second user when the check indicates the conditions is satisfied.

The storage controller may receive a data search request from the second user, and may transmit a search result according to the data search request to the second user, and the information on the data of the data request format may include the search result.

The data search request may include at least one of data tag information, file information, and folder information of the data.

The search result may include at least one of presence or absence of the data, the number of the data, a size of the data, a file name of the data, an address of the data, and information on an owner of the data.

A method for generating a token according to an embodiment includes: receiving a data request format requesting access to data of a first user stored in a storage device from a second user; transmitting the data request format to the first user; receiving an access approval of the first user approving the access to the data; generating the token having an access authority for the data based on the data request format using an Embedded Certificate Authority (ECA); and sending the token to the second user.

The receiving of the access approval may include receiving a semi-token including the data request format, identification information of the first user, a condition of the access approval, and a signature of the first user, and the generating of the token may include generating the token including a signature of the ECA generated by signing the semi-token and information of the ECA with a device private key of the storage device, the semi-token, and the information of the ECA.

The method may further include: receiving the token from the second user; verifying the signature of the ECA with a device public key paired with the device private key; checking whether the data is valid; checking whether the condition of the access approval is satisfied; and sending the data to the second user when the checking indicates the data is valid and the condition is satisfied.

The method may further include: receiving user information including a public key of the second user from the second user; and generating a user certificate including the user information and information of the ECA using a device private key of the storage device.

The method may further include: transmitting a nonce and a device certificate to the second user before the receiving of the data request format from the second user; encrypting the nonce and the user certificate from the second user to obtain a value; verifying the user certificate with a device public key paired with the device private key; and decrypting the value with the public key of the second user included in the user certificate to compare the decrypted value with the nonce.

The method may further include: receiving a data search request from the second user; and transmitting a search result according to the data search request to the second user. The data request format may include the search result.

A storage controller according to an embodiment includes: a certification module and a processor. The certification module issues certificates of a plurality of users using an Embedded Certificate Authority (ECA), verifies a certificate among the certificates of a first user among the plurality of users, generates a token that grants access authority to data of a second user among the plurality of users using the ECA, and verifies the token. The processor provides the data of the second user to the first user when the token is verified.

DETAILED DESCRIPTION OF THE EMBODIMENTS

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

Accordingly, the drawings and description are to be regarded as illustrative in nature and not restrictive. Like reference numerals designate like elements throughout the specification. In the flowcharts described with reference to the drawings in this specification, the operation order may be changed, various operations may be merged, certain operations may be divided, and certain operations may not be performed.

As used herein, the singular forms, "a", "an" and "the" are intended to include the plural forms as well, unless the context clearly indicates otherwise. It will be understood that, although the terms first, second, etc. may be used herein to describe various elements, these elements should not be limited by these terms. These terms are only used to distinguish one element from another element. Thus, a first element discussed below could be termed a second element without departing from the teachings of the present disclosure.

Figure 1:
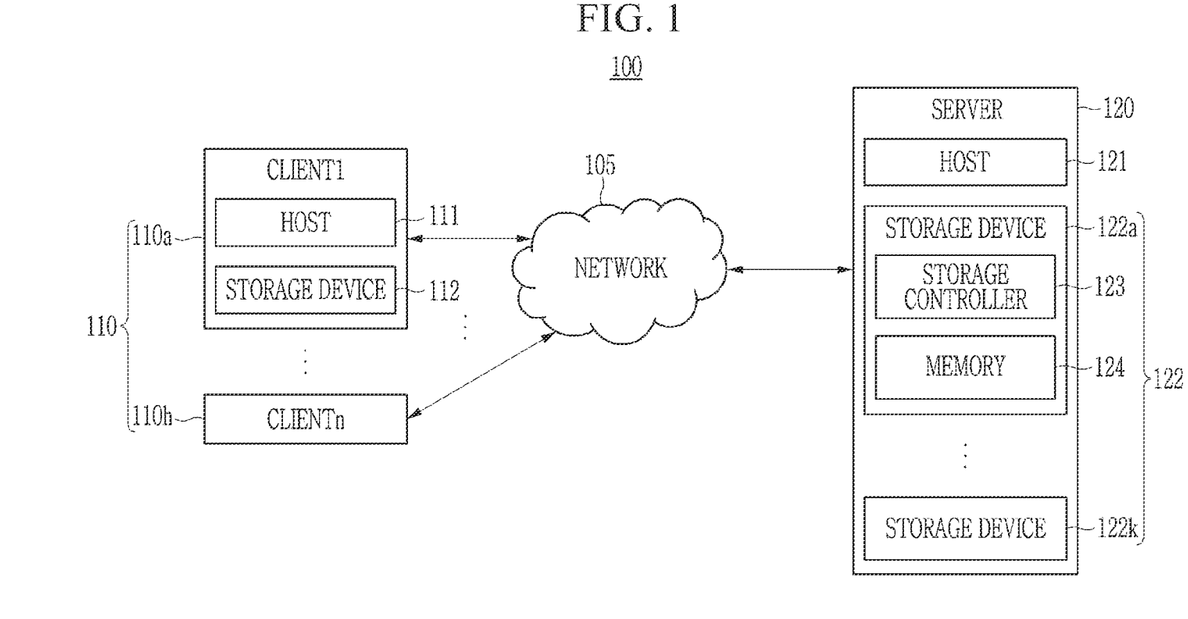
FIG. 1 is a block diagram illustrating a storage system according to an embodiment.

FIG. 1 is a block diagram illustrating a storage system according to an embodiment.

Referring to FIG. 1, the storage system 100 may include at least one client 110a, . . . , 110h and a server 120. The at least one client 110a, . . . , 110h and the server 120 may be connected to each other through a network fabric 105. The at least one client 110a, . . . , 110h may correspond to at least one user.

The client 110 (e.g., 110a) may request data from the server 120 or transmit data to the server 120, and the server 120 may also request data from the client 110 or transmit data to the client 110. In an embodiment, the server 120 receives a request from a user of the client 110a to access user data (e.g., a data access request) of the user stored in the server 120. The server 120 may inform the user of the client 110h of the data access request by the user of the client 110a, and may receive a token from the user of the client 110h allowing access to the user data. The server 120 may deliver the token to the user of the client 110a. The server 120 may receive the data access request for requesting access to the user data together with the token from the user of the client 110a. The server 120 may verify the received token, and may transmit the accessed user data indicated by the token to the client 110a.

The server 120 may include a host 121 and a storage system 122. The host 121 may control the storage system 122.

The host 121 may communicate with the client 110 through a network or a network fabric 105. The host 121 may transmit data transmitted from the client 110 to the storage device 122. The host 121 may transmit data of the storage system 122 to the client 110. The storage device system 122 includes storage devices 122a, . . . , 122k and storage device 122a includes a storage controller 123 and a memory 124. Each of the other storage devices may also include a storage controller and a memory.

An operation of the host 121 described above may also be performed by the storage controller 123 (e.g., a controller circuit). In an embodiment, the storage controllers 123 of the storage devices 122a, . . . , 122k may perform the operation of the host 121. For example, the storage controllers 123 may be clustered to perform the operation of the host 121.

The host 121 may communicate with the storage system 122 through various interfaces. For example, the host 121 may communicate with the storage system 122 through various interfaces such as Universal Serial Bus (USB), MultiMediaCard (MMC), PCI Express (PCI-E), AT Attachment (ATA), Serial AT Attachment (SATA), Parallel AT Attachment (PATA), Small Computer System Interface (SCSI), Serial Attached SCSI (SAS), Enhanced Small Disk Interface (ESDI), Integrated Drive Electronics (IDE), Non-Volatile Memory Express (NVME), and the like.

The storage device 122a may manage an Embedded Certificate Authority (ECA) of the storage device 122a, a device certificate of the storage device 122a, and a unique public key pair of the storage device 122a.

In an embodiment, the storage controller 123 issues or generates a user certificate based on the ECA of the storage device 122a. In an embodiment, the storage controller 123 receives a user certificate issue request from the user, and issues or generates the user certificate including information of the user and ECA information. For example, the user may request that the server 120 issue or generate the user certificate through the client 110. The storage controller 123 in at least one of the storage devices 122*a*, . . . , 122*k* within the server 120 may request the user information from the user, and may issue or generate the user certificate including the user information and the ECA information transmitted from the user.

In an embodiment, the storage controller 123 approves (or authorizes) the user's data access upon verifying the user certificate. In an embodiment, the storage controller 123 verifies the certificate of the user accessing the user's data stored in the storage device 122*a*, exchanges a key for data communication when the verification of the user certificate has completed, and initiates a session for accessing the user's data stored in the storage device 122*a*.

In an embodiment, the storage controller 123 requests access approval from a second user having specific data stored in the storage device 122*a* when there is a request for the specific data from a first user. The storage controller 123 may transmit information having a data request format including an identifier of the first user, information on the specific data, and a signature of the first user to the second user. The second user may approve access of the first user, and may generate a semi-token (or a sub-token) including the data request format, an identifier of the second user, and a signature of the second user. The storage controller 123 may receive the semi-token from the second user, and may generate a token including the semi-token, ECA information, and an ECA signature.

An operation of the storage controller 123 described above may also be performed by the host 121.

The storage device 122 may include storage media for storing data according to a request from the host 121. For example, the storage device 122 may include one or more solid state drives (SSDs). When the storage device 122 includes the SSD, the memory 124 may include a plurality of flash memory chips (e.g., NAND memory chips) that non-volatilely store data. On the other hand, the memory 124 may correspond to one flash memory device, or the memory 124 may include a memory card including one or more flash memory chips.

The memory 124 may include a plurality of storage areas, and may store data corresponding to a plurality of users in the plurality of storage areas. The memory 124 may store data of the first user in a first storage area and data of the second user in a second storage area. The first user and users who have obtained access approval from the first user, i.e., users with tokens capable of accessing the first user's data, may access the first user's data. The plurality of storage areas may be areas for storing data (e.g., general data, security data, or the like). The plurality of storage areas may be referred to as a range, a partition, or the like.

When the storage device 122 includes a flash memory, the flash memory may include a 2D NAND memory array or a 3D (or vertical) NAND (VNAND) memory array. The 3D memory array may be arrays of memory cells having an active region disposed on a silicon substrate or a circuit related to operations of the memory cells, and may be monolithically formed on at least one physical level of a circuit formed on or within a substrate. The term "monolithically" means that the layers of each level of the array are stacked directly on layers of each lower level of the array. The 3D memory array includes vertical NAND strings disposed in a vertical direction so that at least one memory cell is disposed on top of another memory cell. The at least one memory cell may include a charge trap layer.

As another example, the storage device 122 may include other various types of memories. For example, the storage device 122 may include a nonvolatile memory, and the nonvolatile memory may include various types of memories such as a magnetic RAM (MRAM), a spin-transfer torque MRAM, a conductive bridging RAM (CBRAM), a ferroelectric RAM (FeRAM), a phase RAM (PRAM), a resistive RAM, a nanotube RAM, a polymer RAM (PoRAM), a nano-floating gate memory (NFGM), a holographic memory, a molecular electronics memory, an insulator resistance change memory, and the like.

The memory 124 may be an embedded Multi-Media card (eMMC) or an embedded Universal Flash Storage (UFS) memory device. For example, the memory 124 may be an external memory detachable from the storage device 122. Specifically, the memory 124 may include a UFS memory card, a CompactFlash (CF), a Secure Digital (SD), a Micro Secure Digital (Micro-SD), a Mini Secure Digital (Mini-SD), an extreme Digital (xD), or a memory stick, but the present disclosure is not limited thereto.

Figure 2:
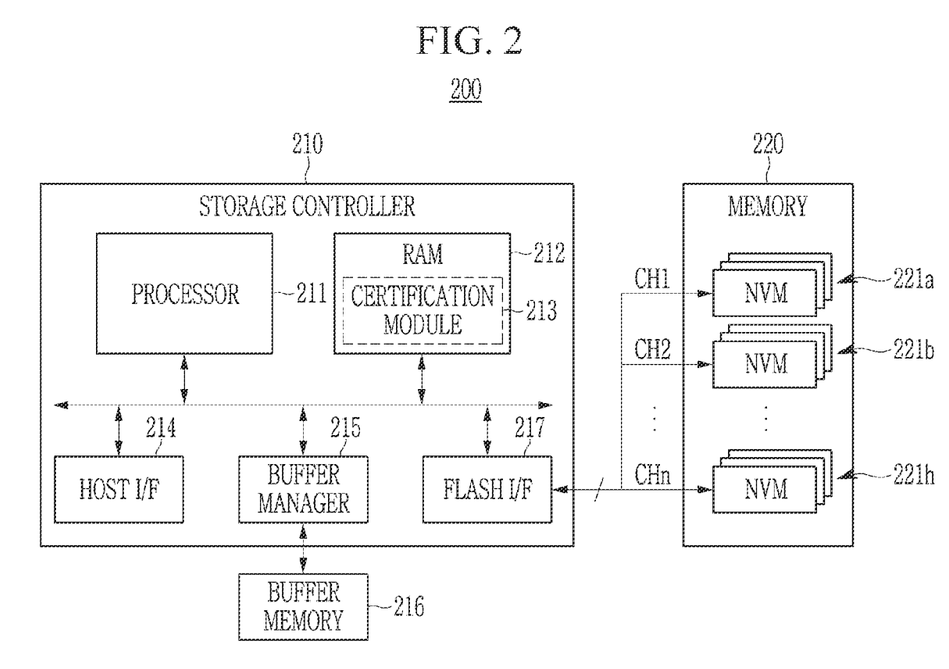
FIG. 2 is a block diagram illustrating a storage device according to an embodiment.

FIG. 2 is a block diagram illustrating a storage device according to an embodiment.

Referring to FIG. 2, the storage device 200 may include a storage controller 210 and a nonvolatile memory device 220. The storage controller 210 may be used to implement storage controller 123 and the nonvolatile memory device 220 may be used to implement memory 124.

The storage controller 210 may access the nonvolatile memory device 220 and a buffer memory 216. The storage controller 210 may perform writing, reading, and erasing according to a request or a command from an external host device. The storage controller 210 may write write-requested data into the nonvolatile memory device 220, and may read and output read-requested data from the nonvolatile memory device 220.

The storage controller 210 may manage the nonvolatile memory device 220 using the buffer memory 216. For example, the storage controller 210 may temporarily store data to be written into the nonvolatile memory device 220 or data read from the nonvolatile memory device 220 in the buffer memory 216.

The storage controller 210 may include a processor 211, a random access memory (hereinafter referred to as a RAM) 212, a host interface 214 (e.g., an interface circuit), a buffer manager 215 (e.g., a manager circuit), and a flash interface 217 (e.g., an interface circuit).

The processor 211 may control an overall operation of the storage controller 210, and may perform a logical operation. The processor 211 may communicate with the host 121 of FIG. 1 through the host interface 214, may communicate with the nonvolatile memory device 220 through the flash interface 217, and may communicate with the buffer memory 216 through the buffer manager 215. The processor 211 may control the nonvolatile memory device 220 using the RAM 212 as an operation memory, a cache memory, or a buffer memory.

The RAM 212 may be used as the operation memory, the cache memory, or the buffer memory of the processor 211. The RAM 212 may store codes and commands executed by the processor 211. The RAM 212 may store data processed by the processor 211. For example, the RAM 212 may be implemented as a static RAM (SRAM). In addition, a Flash Translation Layer (FTL), a file system, or various memory management modules may be stored in the RAM 212. The Flash Translation Layer (FTL) may perform a function such as address mapping, garbage collection, wear leveling, or the like performed for interfacing between the nonvolatile memory device 220 and the host 121 of FIG. 1. The file system may be configured to manage or organize a storage space of the nonvolatile memory device 220.

The RAM 212 may include a certification module (CERTIFICATION MODULE) 213. The certification module 213 may function as an access control that controls access to data stored in the nonvolatile memory device 220. In some embodiments, the certification module 213 may perform a function such as user registration, user certification (or user authentication), token generation, or the like. The certification module 213 may be a computer program executed by the processor 211. Next, with reference to FIG. 3, the certification module 213 of the storage device 200 will be described.

Figure 3:
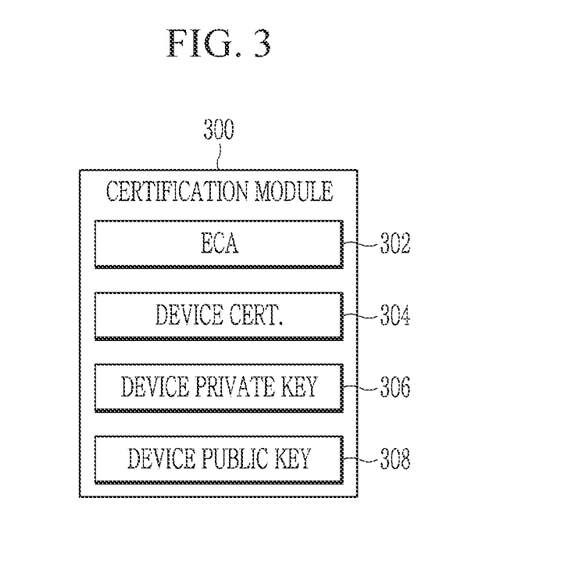
FIG. 3 is a block diagram illustrating an authentication module of the storage device according to an embodiment.

FIG. 3 is a block diagram illustrating the certification module of the storage device according to an embodiment. The certification module 300 may be used to implement the certification module 213.

Referring to FIG. 3, the certification module 300 may generate a user certificate, may verify the user certificate, may generate a token, and may verify the token. The certification module 300 may include an ECA 302, a device certificate (DEVICE CERT.) 304, a device private key (DEVICE PRIVATE KEY) 306, and a device public key (DEVICE PUBLIC KEY) 308.

The certification module 300 may issue or generate the user certificate using the ECA 302, and may generate the token. The ECA 302 may be a computer program that performs a function of issuing a certificate, and may generate a digital signature. In some embodiments, the ECA is installed in the storage device (e.g., 122a) to perform various operations (e.g., email encryption, digital signature, certification, and the like).

The server 120 may provide the device certificate 304 to the user or the client device 110 to be used to verify the storage device. The user or the client device 110 may verify the device certificate 304 based on the certificate using information of a manufacturer or the like included in the device certificate 304. The device certificate 304 may include at least one of a unique identifier used to certify the storage device, and device identification information of the storage device such as a storage device type, a serial number, hardware information (e.g., a processor type), hardware capability, or the like. The device certificate 304 may be signed by a private key of the manufacturer's certificate, and thus may be chained or linked to the manufacturer's certificate. Since the device certificate 304 is linked to the manufacturer's certificate, the device certificate 304 may inherit reliability of the manufacturer's certificate. Accordingly, any device, server, or the like capable of communicating with the storage device 200 may receive the device certificate 304. Since the device certificate 304 is chained or linked to the manufacturer's certificate, the device, the server, or the like may communicate with the storage device's manufacturer to determine whether the device certificate 304 of the storage device may still be trusted. In an embodiment, the device certificate 304 is associated with the device public key 308 used to identify and verify the certificate and any chained or linked certificate. Additionally, the device certificate 304 may be an X.509 certificate.

The device private key 306 may be a key used to electronically sign the user certificate, the token, and the like, and may be paired with the device public key 308.

Referring back to FIG. 2, the host interface 214 is configured to communicate with an external host device according to control of the processor 211. The host interface 214 may be configured to communicate using at least one of various communication methods such as Universal Serial Bus (USB), Serial AT Attachment (SATA), Serial Attached SCSI (SAS), High-Speed Inter-chip (HSIC), Small Computer System Interface (SCSI), Peripheral Component Interconnection (PCI), PCI express (PCIe), Non-Volatile Memory express (NVMe), Universal Flash Storage (UFS), Secure Digital (SD), MultiMediaCard (MMC), embedded MMC (eMMC), Dual In-line Memory Module (DIMM), Registered DIMM (RDIMM), Load Reduced DIMM (LRDIMM), and the like.

The buffer manager 215 may control the buffer memory 216 according to control of the processor 211. The buffer manager 215 may control the buffer memory 216 to temporarily store data exchanged between the nonvolatile memory device 220 and the host 121 of FIG. 1.

The flash interface 217 may communicate with the nonvolatile memory device 220 according to control of the processor 211. The flash interface 217 may communicate with the nonvolatile memory device 220 through a plurality of channels CH1, CH2, . . . , CHn. Specifically, the flash interface 217 may transmit and receive a command, an address, and data to and from the nonvolatile memory device 220 through the plurality of channels CH1, CH2, . . . , CHn.

The nonvolatile memory device 220 may perform a write operation, a read operation, and an erase operation under control of the storage controller 210. The nonvolatile memory device 220 may receive a write command, an address, and data from the storage controller 210, and may write data in a storage space identified by the address. The nonvolatile memory device 220 may receive a read command and an address from the storage controller 210, may read data from a storage space identified by the address, and may output the read data to the storage controller 210. The nonvolatile memory device 220 may receive an erase command and an address from the storage controller 210, and may erase data in a storage space identified by the address.

The nonvolatile memory device 220 may include a plurality of memories 221a, 221b, . . . , 221h. For example, each of the nonvolatile memories 221a, 221b, . . . , 221h may be a NAND (Not AND) flash memory. Each of the nonvolatile memories 221a, 221b, . . . , 221h may include a plurality of memory blocks. Each of the plurality of memory blocks may include a plurality of memory cells. The plurality of memory cells may form a storage space of the nonvolatile memory device 220. The plurality of memory cells may be divided into a main area for storing main data and a spare area for storing additional data and the like such as a parity bit. In some embodiments, one page including a plurality of the memory cells programmed simultaneously may be divided into the main area and the spare area. Each of the plurality of memory blocks may further include selection transistors that support individually selecting the plurality of memory cells.

The nonvolatile memory device 220 may include a flash memory, a phase-change random access memory (PRAM), a Ferroelectric Random Access Memory (FeRAM), a Magnetic random access memory (MRAM), a Resistive Random Access Memory (RRAM) (or a resistive RAM), or the like. For example, the nonvolatile memory device 220 may be configured in any one form of a solid state drive (SSD), a memory card, and an embedded memory card, but the present disclosure is not limited thereto.

Figure 4:
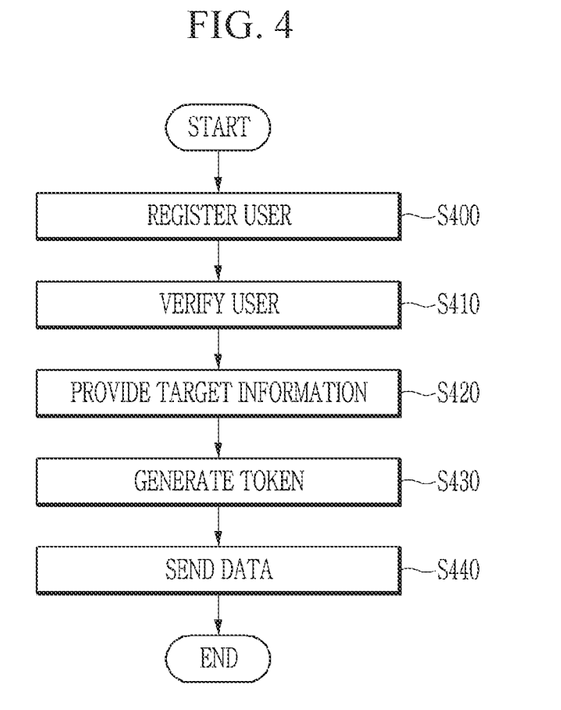
FIG. 4 is a flowchart illustrating a method of operating the storage device according to an embodiment.

FIG. 4 is a flowchart illustrating a method for operating the storage device according to an embodiment.

Referring to FIGS. 2 and 4 together, the storage controller 210 registers a user (S400). The registering may include the storage controller 210 receiving a registration request from the user, requesting user information of the user, and receiving the user information including a public key of the user. The storage controller 210 may generate a user certificate including the user information. The user certificate may include a signature obtained by signing the user information and the ECA information with the device private key 306. The ECA information may be unique information of the ECA 302 stored in the storage device 200, and may include a serial number and the like. The storage controller 210 may transmit (or transfer) the user certificate to the user.

The storage controller 210 verifies the user (S410). The verification may include the storage controller 210 receiving a user's session request, generating a nonce (e.g., information), and transmitting a challenge including the nonce and the device certificate 304. For example, the challenge may be transmitted to the client device 100 of the user. The storage controller 210 may receive a value obtained by encrypting the nonce and the user certificate from the user, and may verify the user certificate. For example, the storage controller 210 may decrypt the signature included within the user certificate using the device public key 308 to generate a decrypted value, and may compare the decrypted value with a hash value of a message. The storage controller 210 may determine that verification of the user certificate is successful if the decrypted value and the hash value of the message match, and may determine that verification of the user certificate has failed if the decrypted value and the hash value of the message do not match. If the verification of the user certificate is successful, the storage controller 210 may decrypt the value obtained by encrypting the nonce with the public key of the user included in the user certificate to generate a decrypted value, and may compare the decrypted value with the nonce. The storage controller 210 may determine that verification of the challenge is successful if the decrypted value and the nonce match, and may determine that verification of the challenge has failed if the decrypted value and the nonce do not match. When the user is verified, the storage controller 210 may exchange a key using a symmetric key method, and may initiate a session.

The storage controller 210 provides target information to the user (S420). The storage controller 210 may receive a search request from the user, and may provide a result of searching based on the search request according to a search condition such as data tag information included in the search request that is the target information to the user. The target information may indicate whether the searched data is present, owner information of the searched data, and the like that are the searched data itself.

The storage controller 210 generates a token (S430). The storage controller 210 may obtain an owner's approval for access to data requested by the user, may generate the token having access authority of the data, and may transfer the generated token to the user.

The storage controller 210 transmits (or sends) data to the user (S440). When the user requests data along with the token, the storage controller 210 may verify the token, and may provide data indicated by the token to the user. For example, the storage controller 210 may determine that access to the data is allowed upon verifying the token.

According to an embodiment, since the storage device generates the token for granting the data access authority based on ECA, security of the data may be increased.

Hereinafter, a method for generating the token of the storage device will be described with reference to FIGS. 2 and 5 to 10.

Figure 5:
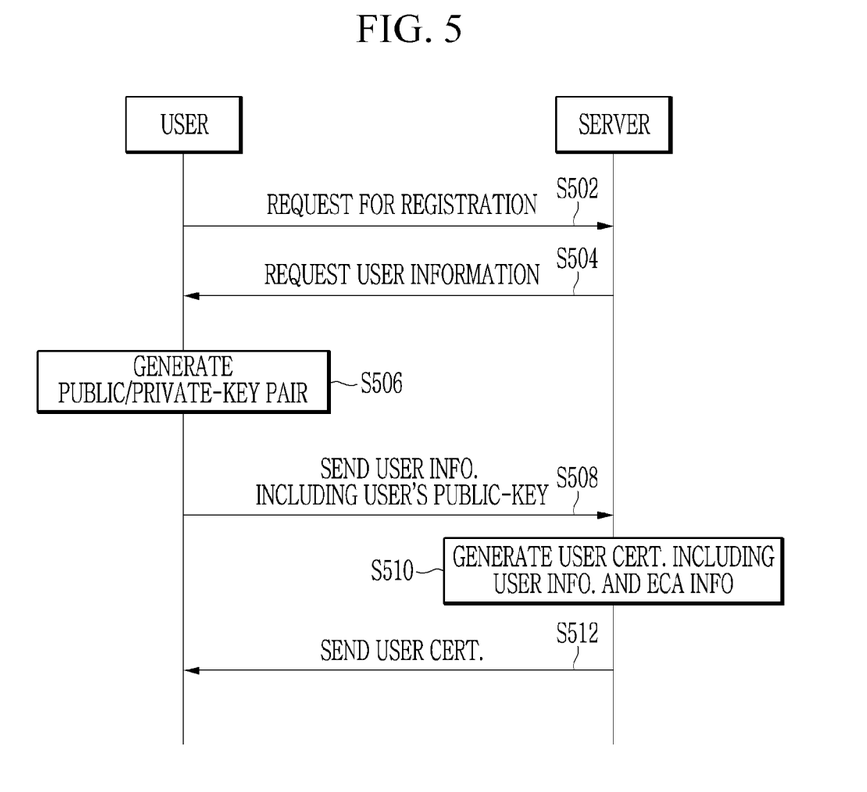
FIG. 5 is a flowchart illustrating a user registration method of the storage device according to an embodiment.

FIG. 5 is a flowchart illustrating a user registration method of the storage device according to an embodiment.

Referring to FIG. 5, the user sends a request (e.g., a user registration request) to the storage device 200 requesting registration (S502). For example, the user may request registration to the server 120 of FIG. 1 through the client 110 of FIG. 1, and the host 121 of FIG. 1 of the server 120 or a cluster of the storage controllers 210 may transmit a user registration request to the storage device (e.g., 122*a*) corresponding to the user. The user's registration request may be transmitted to the storage device (e.g., 122*a*) to which a storage area for storing data of the user is allocated.

The storage device 200 requests information of the user to the user (S504). The storage device 200 may request the user information including the public key of the user from the user. For example, the storage device 200 may request the user information from the user upon receiving the user registration request from the user or the client device 110 of the user.

The user (or the client device 110 of the user) generates a public key and private key pair (S506). The user may generate the public key and private key pair of n bits (n is a natural number). In some embodiments, the user may generate the public and private key pair based on the user information. The user information may include an identification (ID) of the user.

The user (or client device 110 of the user) sends (or transmits) the user information including the public key of the user to the storage device 200 (S508).

The storage device 200 generates the user certificate including the user information and the ECA information (S510). The storage device 200 may generate the user certificate by signing a digest obtained by hashing the user information and the ECA information with the device private key.

The storage device 200 sends (or transmits) the user certificate to the user (S512). For example, the storage 200 may send the user certificate to the user or the client device 110 in response to receiving the user information.

Figure 6:
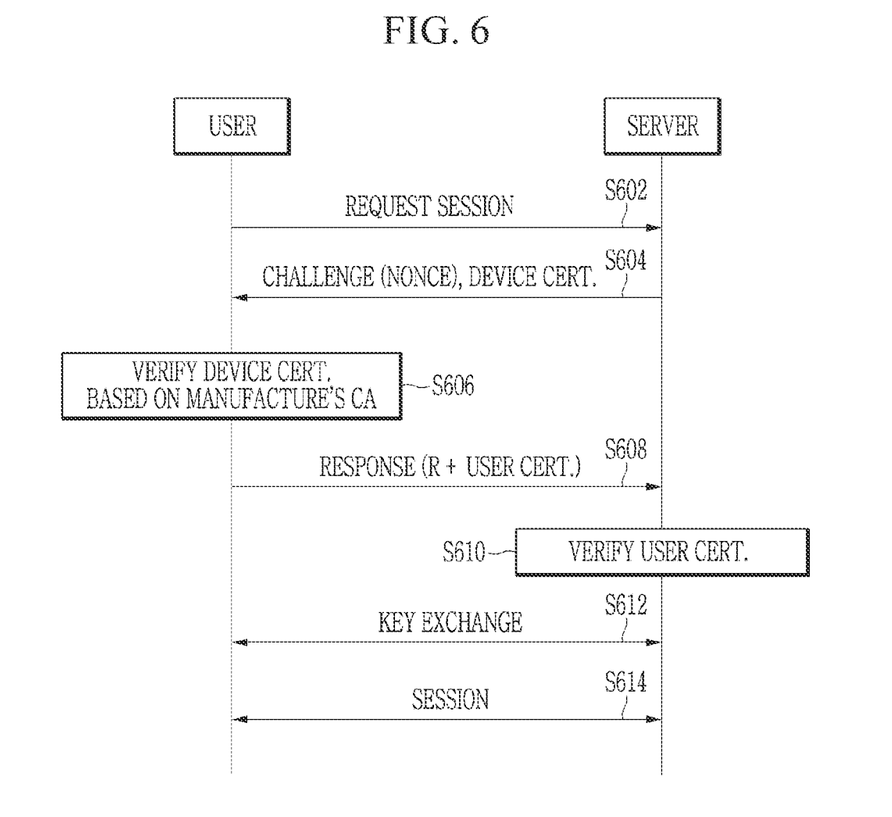
FIG. 6 is a flowchart illustrating a user certification method of the storage device according to an embodiment.

FIG. 6 is a flowchart illustrating a user certification method of the storage device according to an embodiment.

Referring to FIG. 6, the user sends a request (e.g., a session establishment request) the storage device 200 to establish a session (S602). For example, the user may request session establishment to the server 120 of FIG. 1 through the client 110 of FIG. 1. The session establishment request include a session identification (ID), and the host 121 of the server 120 of FIG. 1 or the cluster of the storage controller 123 may transmit the user's session establishment request to the storage device (e.g., 122*a*) corresponding to the user identified from the session ID. The user's session establishment request may be transferred to the storage device (e.g., 122*a*) that performs registration of the user.

The storage device 200 generates the nonce, and transmits the challenge including the nonce and the device certificate to the user (S604). For example, the storage device 200 may transmit the challenge in response to receiving the session establishment request.

The user verifies the device certificate based on the manufacturer's certificate (S606). The user may use the manufacturer information and the like included in the device certificate to verify whether the device certificate is signed by the manufacturer based on the certificate.

When verification of the device certificate has completed, the user encrypts the nonce with the user's private key to generate a value (R), and transmits the value (R) obtained by encrypting the nonce and the user certificate to the storage device 200 (S608). For example, the client device 110 of the user may transmit the value (R) to the storage device 200 upon verifying the device certificate.

The storage device 200 verifies the user certificate (S610). The storage device 200 may decrypt the signature included within the user certificate using the device public key to generate a decrypted value, and may compare the decrypted value with the hash value of the message. The storage device 200 may determine that verification of the user certificate is successful if the decrypted value and the hash value of the message match, and may determine that verification of the user certificate has failed if the decrypted value and the hash value of the message do not match. If the verification of the user certificate is successful, the storage device 200 may decrypt the value (R) obtained by encrypting the nonce with the public key of the user included in the user certificate to generate a decrypted value, and may compare the decrypted value with the nonce included in the challenge. The storage device 200 may determine that verification of the challenge is successful if the decrypted value and the nonce match, and may determine that verification of the challenge has failed if the decrypted value and the nonce do not match. The verification of the user certificate being successful may indicate that the user has been verified.

When the user has been verified, the storage device 200 exchanges the key using the symmetric key method (S612), and initiates the session (S614). For example, when the user has been verified, the storage device 200 may generate a symmetric key for encrypting a communication channel through a key exchange process (S612), and may initiate the session (S614). The user (or the client device 110 of the user) may perform user certification for the storage device 200 and may initiate the session upon data search, data use request, and data use approval.

Figure 7:
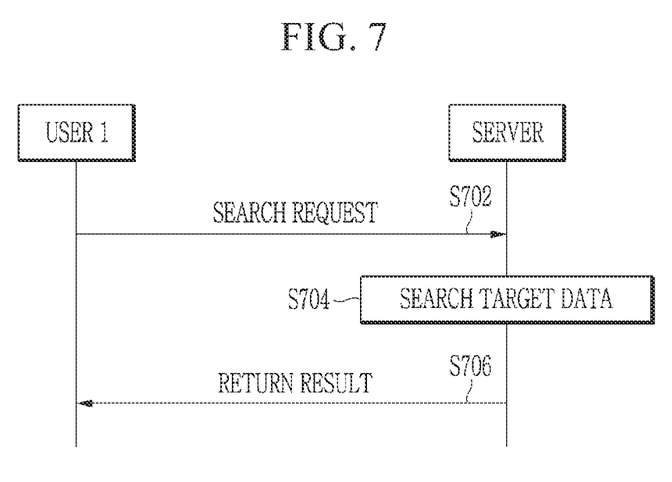
FIG. 7 is a flowchart illustrating a target data searching method of the storage device according to an embodiment.

FIG. 7 is a flowchart illustrating a target data searching method of the storage device 200 according to an embodiment.

As shown in FIG. 7, a user 1 (or a first user) sends a request (e.g., a search request) to the storage device 200 to request a data search (S702). The user 1 may inquire whether the storage device 200 has data to be used by the user 1. For example, the user 1 may inquire whether health information is stored in the storage device 200. In some embodiments, the user 1 may request the data search with data tag information, file information, folder information, or the like. For example, the user 1 may inquire whether data including HEALTH as the data tag information are stored in the storage device 200.

The storage device 200 searches for target data according to the data search request (S704). For example, the storage device 200 may search for the target data in response to receipt of the search request. The storage device 200 may search for the target data corresponding to the data search request among data stored in the nonvolatile memory through the file system. For example, the storage device 200 may search for the data including HEALTH as the data tag information within the nonvolatile memory. The storage device 200 may search for information on a user (that is, an owner of the target data) having access approval authority for the target data.

The storage device 200 transmits a result of the search (e.g., the searched result) to the user 1 (S706). In some embodiments, the storage device 200 may transmit at least one of information such as presence or absence of the target data, the number and size of the target data, and the like, a file name of the target data, an address of the target data, and information on the owner of the target data to the user 1.

Figure 8:
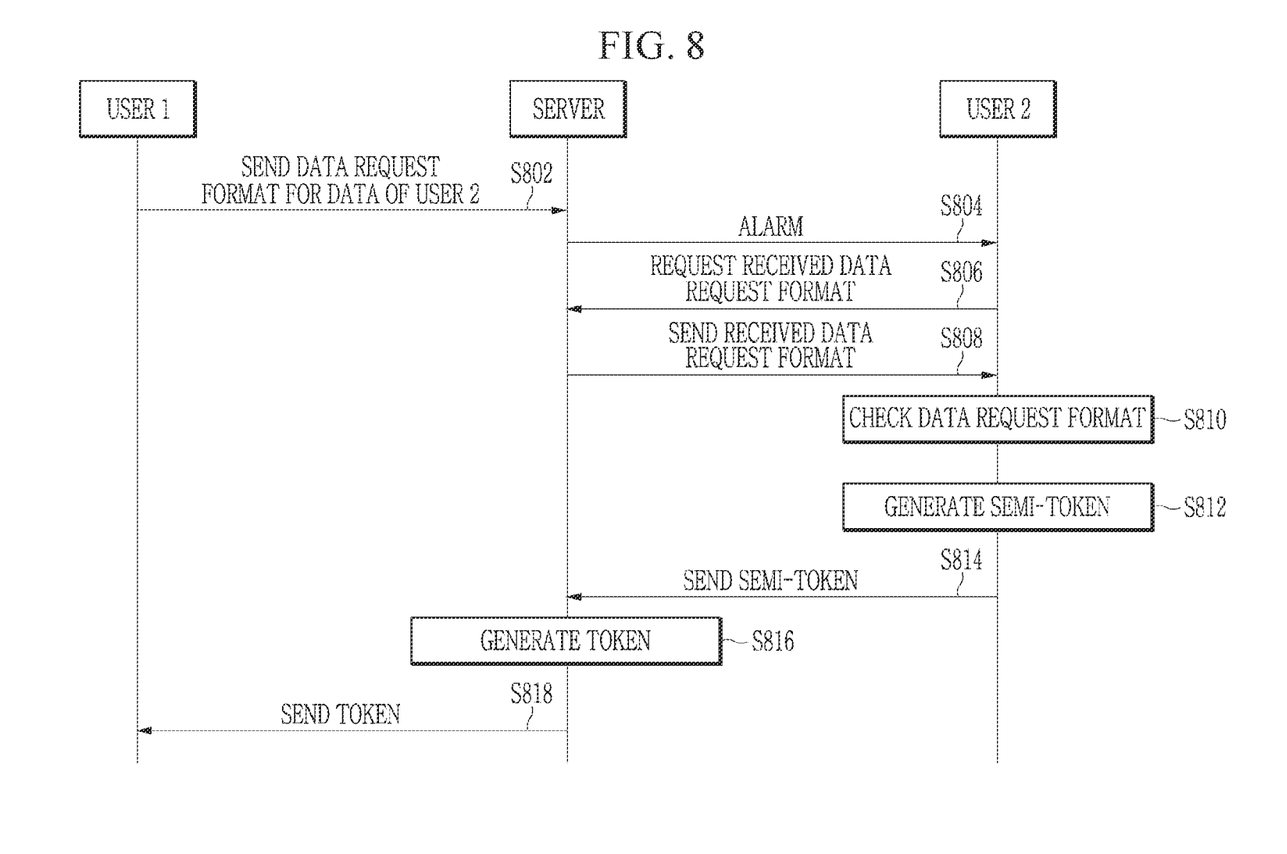
FIG. 8 is a flowchart illustrating a method for generating a token of the storage device according to an embodiment.
Figure 9:
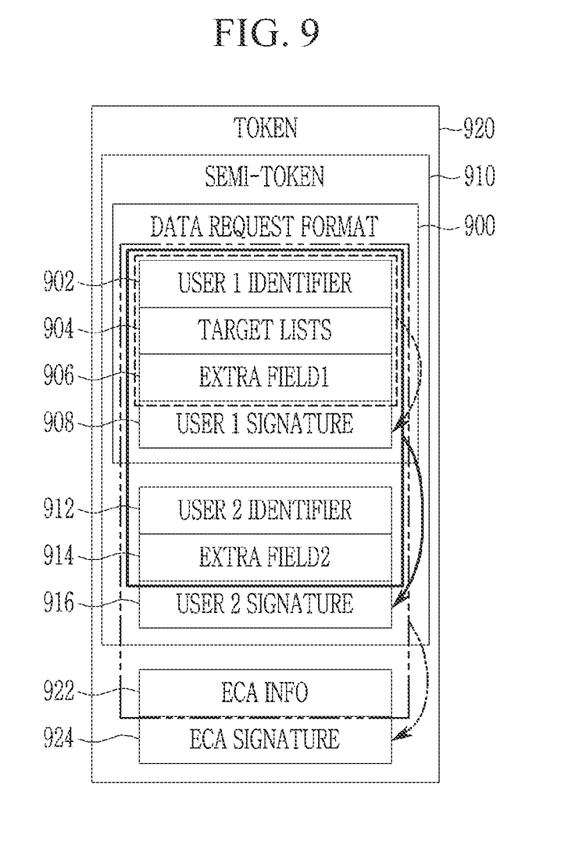
FIG. 9 is a view illustrating an example of a data request format, a semi-token, and a token of the storage device according to an embodiment.

FIG. 8 is a flowchart illustrating a method for generating the token of the storage device 200 according to an embodiment, and FIG. 9 is a view illustrating an example of a data request format, the semi-token, and the token of the storage device 200 according to an embodiment.

Referring to FIG. 8, the user 1 sends (or transmits) a data request format requesting data of a user 2 to the storage device 200 (S802). The user 1 may send the data request format requesting access to data of the user 2 that is the owner of the target data based on the search result received from the storage device 200 in the step S706 of FIG. 7.

Referring to FIG. 9, the data request format 900 may include identification information 902 of the user 1, a list 904 of the target data, an extra field 906, and a signature 908 of the user 1. The identification information 902 of the user 1 may include an identifier (ID) of the user 1 and information of the user 1. The list 904 of the target data may include at least one of the file name, the address, and the like of the target data. The list 904 of the target data may include the target data included in the search result received from the storage device 200 in the step S706 of FIG. 7. The extra field 906 of the target data may include information about at least one of a condition related to the target data, a validity period of a data request, and the like. The user 1 may generate the signature 908 of the user 1 by signing at least one of the identification information 902 of the user 1, the list 904 of the target data, and the extra field 906 with a private key of the user 1.

The storage device 200 transmits an alarm (or a notification) to the user 2 that is the owner of the target data included in the data request format (S804). The storage device 200 may transmit the alarm to the owner of the data requested within the data request format.

The user 2 requests the data request format to the storage device 200 (S806). The user 2 may request the data request format received by the storage device 200 to check information on the target data.

The storage device 200 sends (or transmits) the received data request format to the user 2 (S808). The storage device 200 may transmit a public key of the user 1 or a certificate of the user 1 including the public key of the user 1 to the user 2 along with the data request format.

The user 2 checks the data request format (S810). The user 2 may verify the signature 908 of the data request format 900. The user 2 may verify the data request format 900, and may approve access to the target data. The user 2 may compare a value obtained by decrypting the signature 908 with the public key of the user 1 with a hash value of messages 902, 904, and 906 of the data request format 900. The user 2 may determine that verification of the data request format 900 is successful if the decrypted value and the hash value match, and may determine that verification of the data request format 900 has failed if the decrypted value and the hash value do not match. The user 2 may check the identification information 902 of the user 1 of the data request format. For example, the user 2 may not approve access to the target data based on the identification information 902 of the user 1. The user 2 may check the list 904 of the target data. For example, the user 2 may not approve access to the target data if the target data to be accessed by the user 1 is security data. The user 2 may check the extra field. For example, the user 2 may not approve access to the target data if the extra field 906 includes a condition for reading (or accessing) the target data without a suggestion.

The user 2 generates the semi-token (S812). The user 2 may approve access to the target data, and may generate the semi-token. For example, user 2 or the client device of user 2 may generate the semi-token upon approving access to the target data. In some embodiments, the user 2 may approve access to some of the list of the target data or may approve access to the target data that satisfies a predetermined condition in the list of the target data so that the semi-token is generated. Information on the access approval condition may be recorded in the extra field of the semi-token.

Referring to FIG. 9, the semi-token 910 may include the data request format 900, identification information 912 of the user 2, an extra field 914, and a signature 916 of the user 2. The identification information 912 of the user 2 may include an identifier (ID) of the user 2 identifier (ID) and information of the user 2. The extra field 914 may include information about a condition related to access of the target data, a validity period of a token generated based on the semi-token 910, and the like. The user 2 (or client device of user2) may generate the signature 916 of the user 2 by signing the data request format 900, the identification information 912 of the user 2, and the extra field 914 with a private key of the user 2.

The user 2 sends (or transmits) the semi-token 910 to the storage device 200 (S814).

The storage device 200 generates the token using the semi-token 910 (S816). The storage device 200 may receive the semi-token 910, and may generate the token including the semi-token 910.

Referring to FIG. 9, the token 920 may include the semi-token 910, information 922 of the ECA, and an ECA signature 924. The ECA of the storage device 200 may generate the ECA signature 924 by signing the semi-token 910 and the ECA information 922 with a private key of the device.

The storage device 200 sends (or transmits) the token 920 to the user 1 (S818).

Figure 10:
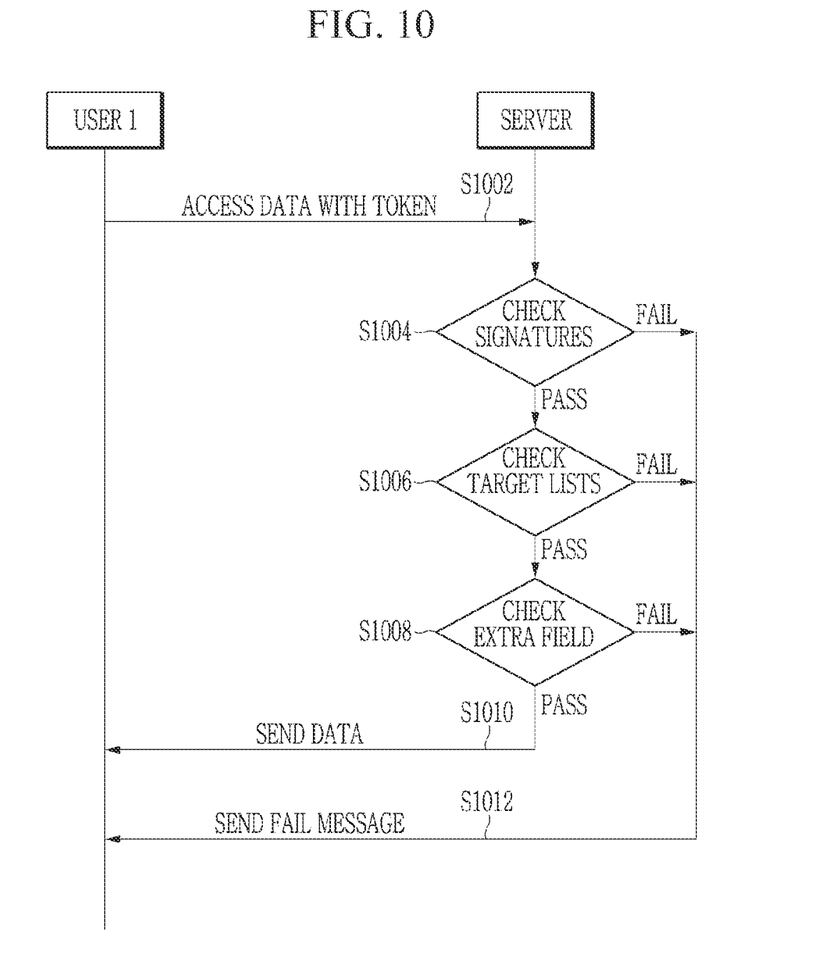
FIG. 10 is a flowchart illustrating a token verification method of the storage device according to an embodiment.

FIG. 10 is a flowchart illustrating a token verification method of the storage device 200 according to an embodiment.

Referring to FIGS. 9 and 10, the user 1 requests access to the data with the token 920 (S1002). For example, a client device of user 1 sends a token to the storage device 200 to request access to the data.

The storage device 200 verifies the ECA signature 924 of the token 920 (S1004). The verifying may include the storage device 200 comparing a decrypted value obtained by decrypting the signature using the device public key with a hash value of messages 910 and 922 of the token 920. The storage device 200 may determine that verification of the token 920 is successful if the decrypted value and the hash value match, and may determine that verification of the token 920 has failed if the decrypted value and the hash value do not match. If the verification fails, the storage device 200 may send (or transmit) a failure message to the user 1 (or the client device of user 1). The failure message may indicate that the verification failed.

The storage device 200 checks the list 904 of the target data of the token 920 (S1006). The storage device 200 may check whether the target data of the target list 904 stored within the nonvolatile memory is valid. If the target data is not valid, the storage device 200 may send (or transmit) the failure message to the user 1.

The storage device 200 checks the extra fields 906 and 914 of the token 920 (S1008). If no data is stored on the storage device 200 that satisfies the conditions associated with the target data included in the extra field 906, the storage device 200 may send the failure message to the user 1. The storage device 200 may check whether the token is valid based on information on an access approval condition included in the extra field 914. If the token 920 is not valid, the storage device 200 may send the failure message to the user 1.

When the token 920 is successfully verified (e.g., passes) in the steps S1004, S1006, and S1008 and a check of the target data and a check of the extra field is completed, the storage device 200 sends (or transmits) the target data to the user 1 (S1010). For example, the storage device 200 may send the target data to a user device of user 1.

Since the storage device 200 according to the embodiment grants data access authority between the users based on the user certificate issued by the ECA and the token signed by the ECA, data may be more easily shared among the users, and the storage device 200 may provide a function for securing data.

Figure 11:
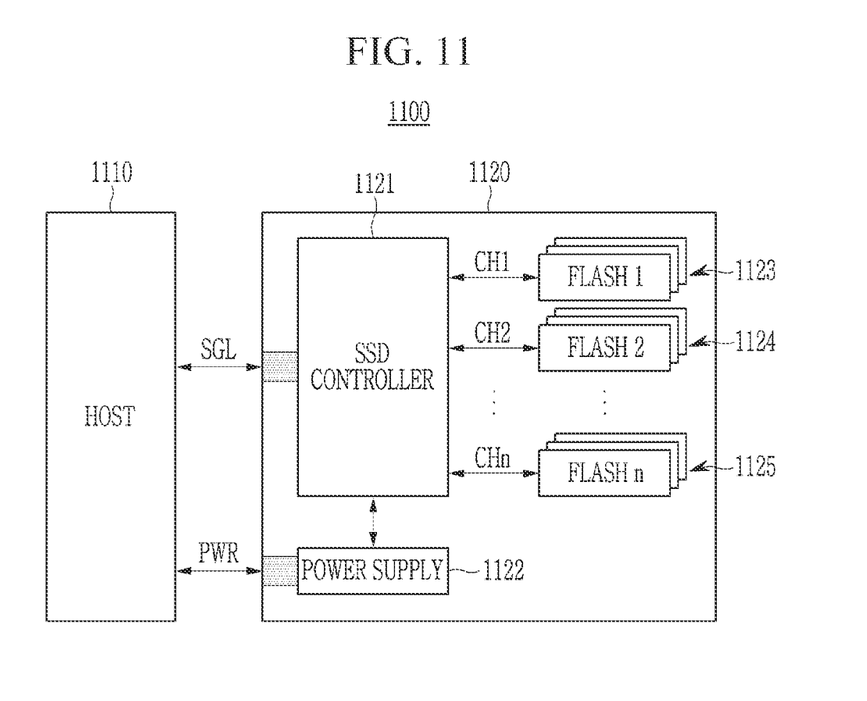
FIG. 11 is a block diagram illustrating an example of applying the storage device according to the embodiment to a solid state drive (SSD) system.

FIG. 11 is a block diagram illustrating an example of applying the storage device according to the embodiment to a solid state drive (SSD) system.

Referring to FIG. 11, the SSD system 1100 may include a host 1110 and an SSD 1120.

The SSD 1120 may be implemented using the embodiments described with reference to FIGS. 1 to 10. The SSD 1120 may exchange a signal with the host 1110 through a signal connector (SGL), and may receive power through a power connector (PWR).

The SSD 1120 may include a controller 1121, an auxiliary power supply 1122, and a plurality of memory systems 1123, 1124, and 1125. Each of the plurality of memory systems 1123, 1124, and 1125 may include one or more flash memory devices as the storage device 200. In addition, each flash memory device may include one or more dies (DIE), and one or more blocks may be disposed in each die (DIE).

The controller 1121 may communicate with the plurality of memory systems 1123, 1124, and 1125 through a plurality of channels Ch1, . . . , Chn. The controller 1121 may issue the user certificate through the ECA, and may perform user certification based on the user certificate. The controller 1121 may issue the token approving the access to data stored in the plurality of memory systems 1123, 1124, and 1125 through the ECA.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A storage device comprising:
a nonvolatile memory storing data of a first user; and
a storage controller configured to receive an access request from a second user to access the data of the first user, obtain access approval for accessing the data from the first user in response to the access request, generate a token granting access authority to the second user for accessing the data using an Embedded Certificate Authority (ECA) upon obtaining the access approval, and send the token to the second user.

2. The storage device of claim 1, wherein the storage controller is configured to receive user information including a public key of the second user from the second user, and generate a user certificate including the user information and information of the ECA using a device private key of the storage device.

3. The storage device of claim 2, wherein the storage controller is configured to transmit a nonce and a device certificate to the second user, receive a value obtained by encrypting the nonce and the user certificate from the second user, verify the user certificate with a device public key paired with the device private key, decrypt the value with the public key of the second user included in the user certificate to generate a decrypted key, and compare the decrypted value with the nonce.

4. The storage device of claim 1, wherein the access request includes a data request format including identification information of the second user, information on the data, and a signature of the second user.

5. The storage device of claim 4, wherein the storage controller is configured to receive a data search request from the second user, and transmit a search result according to the data search request to the second user, and the information on the data of the data request format includes the search result.

6. The storage device of claim 5, wherein the data search request includes at least one of data tag information, file information, and folder information of the data.

7. The storage device of claim 5, wherein the search result includes at least one of the presence or absence of the data, the number of the data, a size of the data, a file name of the data, an address of the data, and information on an owner of the data.

8. The storage device of claim 5, wherein the access approval of the first user includes a semi-token including the data request format, identification information of the first user, a condition of the access approval, and a signature of the first user.

9. The storage device of claim 8, wherein the storage controller is configured to generate the token including a signature of the ECA generated by signing the semi-token and information of the ECA with a device private key of the storage device, the semi-token, and the information of the ECA.

10. The storage device of claim 9, wherein the storage controller is configured to receive the token from the second user, check whether the data is valid, and send the data to the second user when check indicates the data is valid.

11. The storage device of claim 9, wherein the storage controller is configured to receive the token from the second user, check whether the condition of the access approval is satisfied, and send the data to the second user when the check indicates the condition is satisfied.

12. The storage device of claim 9, wherein the storage controller is configured to receive the token from the second user, verify the signature of the ECA, and send the data to the second user when the signature is verified.

13. The storage device of claim 12, wherein the storage controller is configured to verify the signature of the ECA with a device public key paired with the device private key.

14. A method for generating a token, comprising:
receiving a data request format requesting access to data of a first user stored in a storage device from a second user;
transmitting the data request format to the first user;
receiving an access approval of the first user approving the access to the data;
generating the token having access authority for the data based on the data request format using an Embedded Certificate Authority (ECA); and
sending the token to the second user.

15. The method of claim 14, further comprising:
receiving a data search request from the second user; and
transmitting a search result according to the data search request to the second user,
wherein the data request format includes the search result.

16. The method of claim 14, wherein the receiving of the access approval includes receiving a semi-token including the data request format, identification information of the first user, a condition of the access approval, and a signature of the first user, and the generating of the token includes generating the token including a signature of the ECA generated by signing the semi-token and information of the ECA with a device private key of the storage device, the semi-token, and the information of the ECA.

17. The method of claim 16, further comprising:
receiving the token from the second user;
verifying the signature of the ECA with a device public key paired with the device private key;
checking whether the data is valid;
checking whether the condition of the access approval is satisfied; and
sending the data to the second user when the checking indicates the data is valid and the condition is satisfied.

18. The method of claim 14, further comprising:
receiving user information including a public key of the second user from the second user; and
generating a user certificate including the user information and information of the ECA using a device private key of the storage device.

19. The method of claim 18, further comprising:
transmitting a nonce and a device certificate to the second user before the receiving of the data request format from the second user;
receiving a value obtained by encrypting the nonce and the user certificate from the second user;
verifying the user certificate with a device public key paired with the device private key; and
decrypting the value with the public key of the second user included in the user certificate to compare the decrypted value with the nonce.

20. A storage controller comprising:
a certification module configured to issue certificates of a plurality of users using an Embedded Certificate Authority (ECA), verify a certificate among the certificates of a first user among the plurality of users, generate a token that grants access authority to data of a second user among the plurality of users using the ECA, and verify the token; and
a processor configured to provide the data of the second user to the first user when the token is verified.

* * * * *